March 6, 1934.  H. M. MATTAIR ET AL  1,949,612
SELF LUBRICATING PISTON
Filed June 29, 1932
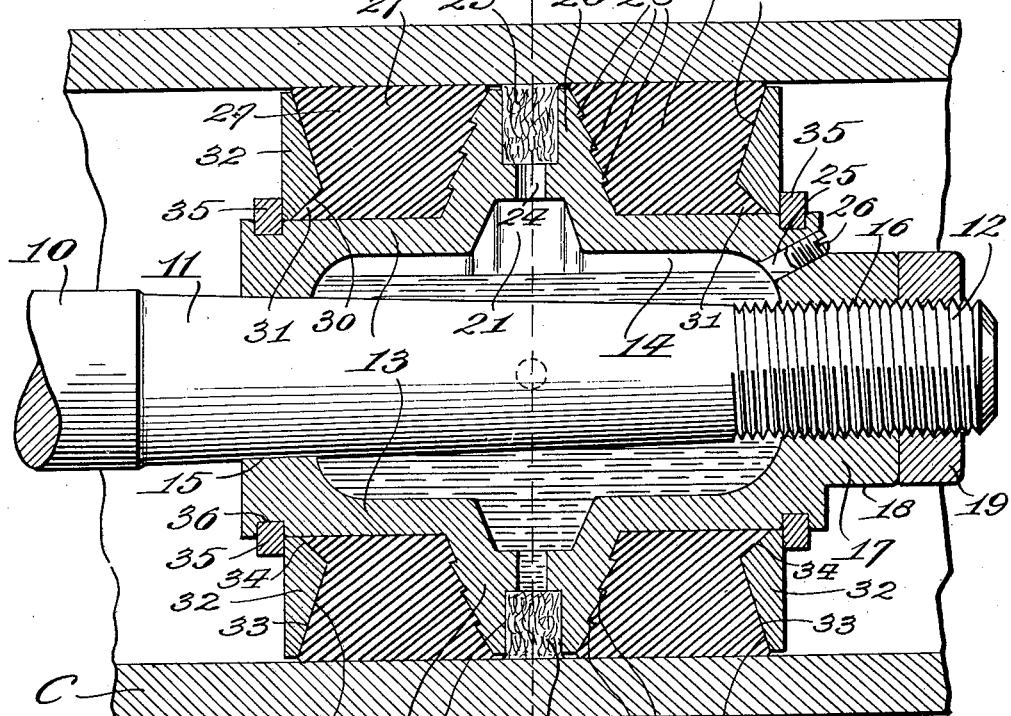
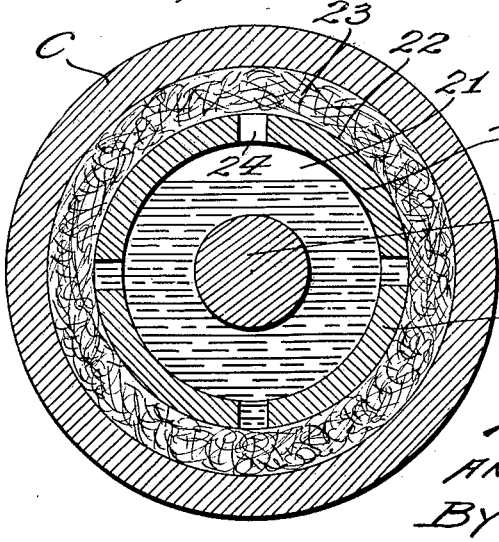
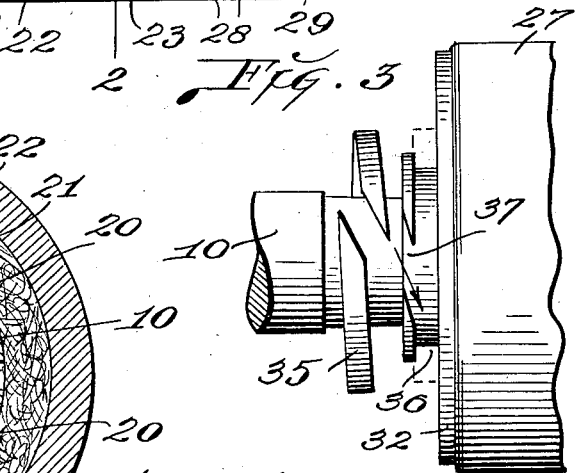
INVENTORS.
HIRAM M. MATTAIR,
AND ROBERT S. WILLIS.
BY Martin P. Smith ATTY.

Patented Mar. 6, 1934

1,949,612

UNITED STATES PATENT OFFICE 1,949,612

SELF-LUBRICATING PISTON

Hiram M. Mattair, Long Beach, and Robert S. Willis, Lynwood, Calif.

Application June 29, 1932, Serial No. 619,930

4 Claims. (Cl. 309—6)

Our invention relates to a self lubricating piston particularly of the type disclosed in U. S. Letters Patent No. 1,768,663, issued July 1st, 1930 and which patent has been duly transferred to us by assignments.

The principal objects of our present invention are, to generally improve upon and simplify the construction of the piston disclosed in the aforesaid patent as well as other existing forms of pistons that are utilized in the mud pumps of oil well apparatus, to provide a piston construction that may be readily assembled or taken apart, thereby greatly facilitating repairs and particularly the removal and replacement of the packing rings of rubber that are carried by the body of the piston and which engage the inner surface of the pump cylinder and further, to provide a piston wherein the pressure of the fluid that passes through the pump and which is acted upon by the piston, is effective in imparting radial pressure to the packing rings so as to produce the desired fluid pressure tight joints between the piston and the wall of the cylinder.

A further object of our invention is, to provide simple and efficient means for applying liquid lubricant directly to the inner surface of the cylinder, thereby providing an effective lubrication of the piston as it reciprocates within the cylinder and the lubricant being applied to the inner surface of the cylinder with a wiping motion, thereby insuring application of lubricant to all portions of the surface with which the piston makes contact.

A further object of our invention is, to provide means for providing fluid pressure tight joints between the rubber packing rings and the body of the piston on which said packing rings are carried and further, to provide simple and efficient means whereby the inner end portions of the packing rings are anchored to the body of the piston so that only the intermediate portions of the bodies of the packing rings are expanded radially as a result of fluid pressure upon the ends of the piston and as a result of such provision, the periods of service of the packing rings are greatly increased.

With the foregoing and other objects in view our invention consists in certain novel features of construction and arrangements of parts that will be hereinafter more fully described and claimed and illustrated in the accompanying drawing in which:

Fig. 1 is a section taken lengthwise through the center of a piston of our improved construction and showing the same within a cylinder.

Fig. 2 is a cross section on a reduced scale and taken on the line 2—2 of Fig. 1.

Fig. 3 is an elevational view of the end portion of the piston and showing one of the follower plate retaining rings in position to be applied to the piston.

Referring by numerals to the accompanying drawing which illustrates a preferred embodiment of our invention, 10 designates a piston rod having a tapered end portion 11 and the end of this tapered portion is externally threaded as designated by 12.

The main body 13 of the piston comprises a cylindrical block provided with a chamber 14 that is adapted to contain liquid lubricant and one end of this body is provided with a tapered opening 15 that is adapted to receive the larger portion of the tapered end 11 of the piston rod and the opposite end of body 13 is provided with a threaded opening 16 that receives the threaded end 12 of the piston rod.

Formed integral with the end of body 12 that is provided with the threaded opening 16, is a lug or extension 17 having flat faces 18 that are adapted to be engaged by a wrench or light tool when the piston body is screwed onto or off the end of the piston rod.

A lock nut 19 is screw-seated on the projecting portion of the threaded end of the piston rod for the purpose of locking the piston to the rod.

Formed integral with the piston body 13 at a point intermediate its ends, is a circumferential rib 20, having its side faces inclined in opposite directions so that said rib is substantially V-shape in cross section.

Formed in the inner portion of this rib 20, is a circumferential groove 21 that communicates with the chamber 14 in the piston body and formed in the outer portion of said rib, is a circumferential groove 22. Seated in groove 22 is a ring 23 of felt or analogous material, the periphery of which projects slightly beyond the periphery of rib 20 so as to make wiping contact with the inner face of the cylinder C in which the piston operates and thereby spread a film of lubricating oil upon the cylinder face.

Formed in rib 20 is a plurality of apertures 24 that establish communication between the groove 21 and groove 22, thereby enabling liquid lubricant to flow freely from the storage chamber 14 within the piston body 13 to the felt ring 23. These apertures 24 are preferably located 90° apart.

Formed through the end of body 13, adjacent to lug or extension 17, is an opening 25, through which liquid lubricant may be delivered into the storage chamber 14 and this opening is normally closed by a screw plug 26.

Removably positioned on the end portions of body 13, are packing rings 27 of rubber or elastic composition, of which rubber is a principal ingredient, and these rings constitute expansible packing members between the piston body 13 and the cylinder wall.

The inner ends of these packing rings are inclined to correspond with the inclination of the side faces of rib 20 and in order to anchor the inner ends of these rings to the rib and prevent those portions of the bodies of the packing rings that engage the rib from being forced radially outward as the rings are subjected to pressure.

The faces of rib 20 are provided within spaced concentric shoulders 28 that engage the inner end faces of the expansible packing rings and said shoulders are arranged so as to oppose the outward or radial movement of the engaged end portions of the packing rings.

The outer ends of the packing rings 27 are circumferentially grooved so as to form relatively wide inclined faces 29, that extend inwardly from the outer edge of said packing rings and relatively short inclined faces 30 that extend outwardly from the inner edges of the ends of said rings.

The inclination of the relatively narrow inclined faces 30 is approximately 45° with respect to vertical and horizontal planes and thus relatively small triangular ribs 31 are formed on the ends of the packing rings adjacent to the openings therethrough.

Arranged for sliding movement on the end portions of cylinder body 13 that projects beyond the packing rings 27, are follower plates or rings 32, preferably of metal, and the inner faces of these follower plates are provided with inclined faces 33 that engage the inclined faces 29 on the ends of the packing rings and said following plates being also provided with inclined faces 34 that engage the inclined faces 30 on the triangular ribs 31.

Follower plates 32 are retained in position on the ends of body 13, by means of retaining rings 35 that are removably arranged in grooves 36 and which latter are formed in the periphery of body 13 adjacent to the ends thereof. These retaining rings may be of the ordinary split type that are snapped into the grooves 36 after the manner of ordinary piston packing rings or, as illustrated in Fig. 3, the rings may be constructed somewhat similar to a lock washer with tapered end portions and when the rings are applied to the grooves, they are inserted thereinto by a circumferential or screwing movement through an inclined opening 37 that is formed in the flange immediately adjacent to groove 36.

When these retaining rings are properly seated in the grooves 36, they overlie the inner portions of the follower plates 32 and thereby retain said follower plates in proper position upon the piston body and when said plates are so positioned, the inclined inner faces thereof engage directly against the corresponding inclined faces on the outer ends of the packing rings.

When the parts of our improved piston are properly assembled and the piston is positioned upon the end of the piston rod within the cylinder and said piston rod is reciprocated, the resistance offered by the "mud" or fluid that is being pumped, will act alternately upon the straight outer faces of the follower plates 32, to move said plates inwardly toward the rib 20, with the result that the greater portion of the body of the packing ring that is under pressure will tend to expand radially outward so that an effective fluid pressure tight joint is produced between the outer periphery of the packing ring and the inner face of the cylinder wall and simultaneously the inclined inner face 34 on the follower plate will exert pressure on the inclined outer face of rib 31 to force said rib into intimate contact with the periphery of the piston body and consequently produce a fluid pressure tight joint between said piston body and the packing ring.

Thus during each stroke of the reciprocating piston, one of the packing rings is automatically compressed as a result of pressure of the "mud" or liquid against the outer face of one of the follower plates and the packing ring that is acted upon is expanded radially so as to produce fluid pressure tight joints between the packing ring and the piston and likewise between the packing ring and the wall of the cylinder in which the piston reciprocates.

During operation of the piston within the cylinder, the felt ring 23, which is at all times impregnated with liquid lubricant that flows from storage chamber 14 through openings 24, will be delivered onto the inner surface of the cylinder so as to provide proper lubrication for the piston as the same is reciprocated within the cylinder.

In practically all "mud" pumps now in general use it is necessary to remove the entire piston rod from the cylinder in order to replace or repack the piston, but by our improved construction, the piston may be readily removed from the piston rod by removing lock nut 19 and then applying a suitable wrench to the faces 18 of lug 17 and unscrewing the entire piston assembly from the tapered end of the piston rod.

The retaining rings 35 are readily removed from the ends of the piston body 13 and thus it is a comparatively easy matter to remove and replace the elastic packing rings 27.

The follower plates 32 and the felt ring 23 provide protection for the elastic packing rings against elements in the "mud" that would otherwise have a deleterious action upon the rubber or composition of which the rings are formed.

In some instances it may be found desirable to vulcanize the packing rings directly to the peripheral surface of the body 13 or to the side faces of rib 20 or to both the body and said rib and likewise it may be found desirable to vulcanize the packing rings directly to the follower plates 32.

The shoulders 28 prevent the inner end faces of the packing rings from moving radially outward as said rings are compressed and the inner faces of the follower plates and the outer end faces of the packing rings are formed so that the pressure that is exerted against the outer faces of the follower plates acts on the outer end portions of the packing rings so as to expand the same radially in opposite directions and thereby produce the desired fluid pressure tight joints between the inner portions of the rings and the piston body and between the outer portions of said rings and the wall of the cylinder.

Thus it will be seen that we have provided a self lubricating piston that is relatively simple in construction, inexpensive of manufacture, capable of being readily assembled or taken apart and very effective in performing the functions for which it is intended.

It will be understood that minor changes in the size, form and construction of the various parts of our improved self lubricating piston may be made and substituted for those herein shown and described without departing from the spirit of the invention, the scope of which is set forth in the appended claims.

We claim as our invention:

1. A self lubricating piston, comprising a piston body having a liquid lubricant chamber, a pair of compressible packing rings removably arranged on said body, a fibrous ring arranged on said body between said packing rings, liquid lubricant supply ducts leading from the chamber within the piston body to said fibrous ring the outer end of each packing ring having a pair of circumferential inclined faces and follower plates loosely mounted on the ends of the piston body and bearing against the outer ends of said packing rings, each follower plate being provided with a pair of circumferential inclined faces that engage the corresponding inclined faces on the outer ends of said packing rings.

2. In a self lubricating piston, a piston body, a pair of compressible packing rings arranged on the end portions of said body, follower plates loosely mounted on the end portions of the piston body and engaging the outer ends of said packing rings, the inner faces of which follower plates are formed so that when said plates are moved inward from the ends of the piston body said inner faces will exert inward radial pressure to those portions of the ends of the packing rings adjacent to the piston body and outward radial pressure to those portions of the outer ends of the packing rings that are adjacent to the wall of the cylinder in which the piston is positioned a rib formed on said piston body between said packing rings and packing ring engaging shoulders formed on the side faces of said rib.

3. In a self lubricating piston, a piston body, a pair of compressible packing rings arranged on the end portions of said body, follower plates loosely mounted on the end portions of the piston body and engaging the outer ends of said packing rings, the inner faces of which follower plates are formed so that when said plates are moved inward from the ends of the piston body said inner faces will exert inward radial pressure to those portions of the ends of the packing rings adjacent to the piston body and outward radial pressure to those portions of the outer ends of the packing rings that are adjacent to the wall of the cylinder in which the piston is positioned, said piston body having a liquid lubricant chamber, a fibrous ring arranged in the outer portion of said rib and liquid lubricant ducts leading from the chamber within said piston body to said fibrous ring.

4. The combination with a piston rod having a tapered portion and the end of said tapered portion being externally threaded, of a piston body mounted on the tapered portion of said piston rod, one end of which piston body is screw-seated on the threaded end of the tapered portion of said piston rod, said piston body being provided with a liquid lubricant chamber, a pair of compressible packing rings arranged on the end portions of said piston body, a fibrous ring arranged on said body between said packing rings, liquid lubricant ducts leading from the chamber in said body to said fibrous ring and follower plates loosely arranged on the end portions of the piston body and engaging the outer ends of said packing rings.

HIRAM M. MATTAIR.
ROBERT S. WILLIS.